Feb. 27, 1951 J. S. ADKINS 2,542,975
ERECTING MECHANISM FOR REDUCING TURN
ERRORS IN VERTICAL GYROSCOPES
Filed Feb. 21, 1950
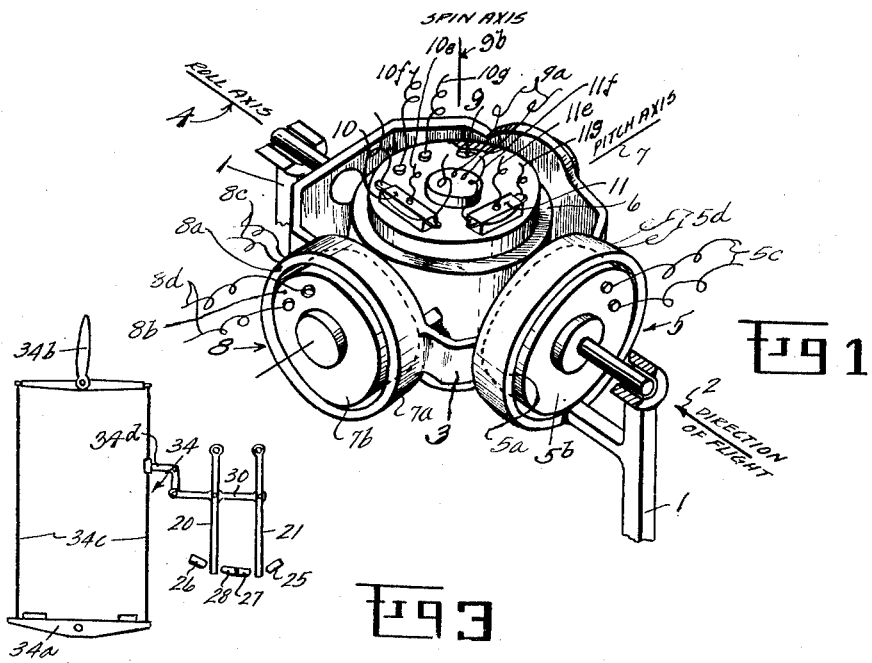
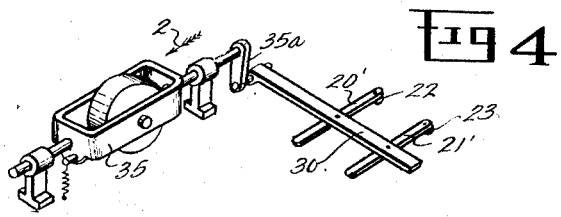
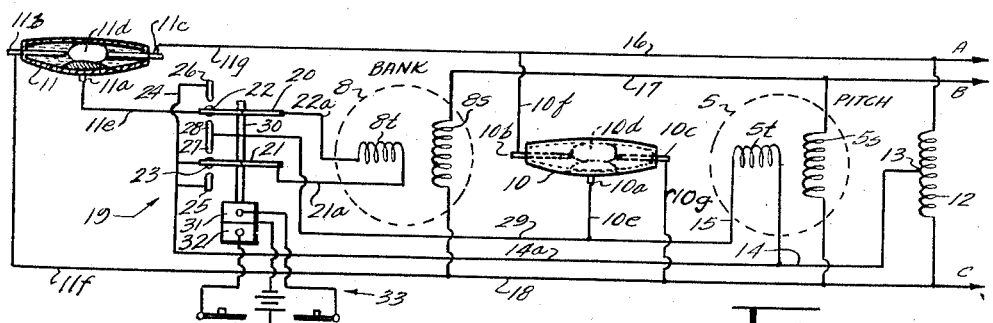
INVENTOR.
JOHN S. ADKINS
BY Wade Koontz
Charles H. Wagner
ATTORNEYS Patented Feb. 27, 1951

2,542,975

UNITED STATES PATENT OFFICE 2,542,975

ERECTING MECHANISM FOR REDUCING TURN ERRORS IN VERTICAL GYROSCOPES

John S. Adkins, Dayton, Ohio

Application February 21, 1950, Serial No. 145,515

11 Claims. (Cl. 74—5.47)

(Granted under the act of March 3, 1883, as amended April 30, 1928; 370 O. G. 757)

The invention described herein may be manufactured and used by or for the Government for governmental purposes without payment to me of any royalty thereon.

This invention relates to gyroscopes and more particularly to erecting mechanism for reducing turn errors in vertical gyroscopes.

In conventional erecting mechanisms for vertical gyroscopes an error both in "pitch" and "roll" develops, during and following turns of an aircraft having gyroscopes with the well known conventional erecting mechanisms, especially when the turns are prolonged. As the aircrafts turn the gyroscopes become displaced due to horizontal "acceleration" or centrifugal forces acting on the roll-responsive gravitational devices to displace them from a true vertical position, first causing a roll error to be present during the first part of the turn, then as the turn continues this "roll" error appears on the indicating instrument as a "pitch" error and accumulates so rapidly that the conventional erecting system cannot correct it fast enough to be satisfactory as the turn continues or terminates. This conversion being due to the change in the pilot's observation point relative to the gyroscope's tilted position in space.

A conventional gyroscope and means for controlling, at least to some extent, the error as indicated above is disclosed in U. S. Patent 2,446,180 to R. Haskins, Jr., dated August 3, 1948. It utilizes an electric switch device which is designed to control the erecting torque motors in proportion to the degree of acceleration during turns, with a greater erection on the roll displacement than on the pitch displacement.

I propose to reduce or eliminate the turn error in a quite different and more satisfactory manner by utilizing the pitch erecting mechanism to control the "banks" or roll erection during turns, thereby greatly reducing turn errors, at least to a point where they are not dangerous or serious. In other words, during a turn, the bank error in a gyroscope is converted into an indicated pitch error, and by placing the roll erecting mechanism under the control of the pitch control gravity responsive device during the turn to control the roll erecting mechanism, the turn errors are greatly reduced. I propose to use a simple switching device which is operated either manually at the beginning of the turn, or automatically by the steering mechanism, or a rate of turn conventional gyroscope, to switch in or connect the "bank" or roll erecting mechanism to the pitch control gravity responsive device so that throughout at least the major portion of the turn the bank or roll erecting mechanism is controlled by the "apparent" pitch error, as determined by the pitch control gravity responsive device and after the turn is completed the controls are normalized and the roll and pitch erection are then the same as in a conventional, magnetically torqued, vertical gyroscope.

Other objects and advantages of the invention will become apparent from the following description, when considered in connection with the accompanying drawings, in which like reference characters refer to like parts in the several figures.

Figure 1 is a somewhat diagrammatic perspective view of a conventional "vertical" gyroscope having electrically operated pitch and roll erecting or precessing motors and an electrically driven rotor;

Figure 2 is a simple wiring diagram for a gyroscope incorporating my invention;

Figure 3 is a diagrammatic view, showing the control mechanism connected in the steering apparatus, so that actuation of the rudder operates my improved control apparatus automatically; and Figure 4, is a detail view, showing a conventional rate of turn gyroscope somewhat diagrammatically, connected to the switching device to operate the switching device automatically during turns.

Referring to Figure 1, which schematically illustrates a somewhat conventional gyro vertical, the reference numeral 1 denotes a portable support, adapted to be mounted in a craft such as an airplane and movable with the craft in straight flight in the direction of the arrow 2, an outer gimbal indicated at 3 being tiltably journalled on the support 1, on a roll axis 4.

A reversible electric or electromagnetic pitch torque motor 5 is interposed between the support 1 and the outer gimbal 3, having a stator 5a fixed to the support 1 and a rotor 5b fixed to the outer gimbal 3 concentric to the roll axis 4. An inner gimbal 6 is journalled in the outer gimbal 3 on a pitch axis 7 intersecting the roll axis 4, perpendicular thereto. A roll torque motor 8 is interposed between the inner and outer gimbals 6 and 3 having a stator 8a fixed to the outer gimbal 3 and a rotor 8b fixed to the inner gimbal 6, the stator and rotor 8a and 8b being disposed concentric to the pitch axis 7. Electric conductors are provided for energizing the pitch and roll motor stator and rotor coils indicated in this figure of the drawing respectively at 5c, 5d and 8c, 8d.

Located within the inner gimbal 6 is a gyro vertical or rotor 9, preferably electrically driven by an electric motor, by energy supplied through the conductors 9a in the conventional manner from any suitable electrical source. The rotor spin axis is indicated at 9b, when the gyroscope is vertical, the spin axis 9b intersecting the pitch and roll axes 7 and 4, perpendicular to the roll axis 4 permitting the rotor spin axis 9b to relatively tilt in the pitch direction about the "pitch" axis 7 when the support 1 tilts in the pitch direction, and to tilt in the "roll" direction about the roll axis 4 when the support tilts in the roll or bank direction, in the well known manner.

Located, preferably on the top of the inner gimbal 6, are a pair of gravity controlled pitch and roll control devices or pendulum members indicated respectively at 10 and 11. These are also conventional and may be of any form, such as single pole, double throw gravity controlled resistance switch devices, such as shown in Figure 2 of the drawings, and shown in the Haskins, Jr., patent referred to above.

The gravity responsive pitch and roll switches 10 and 11 act as levels, being disposed respectively at right angles to each other on the inner gimbal 6, and are in level position when the rotor spin axis 9b is vertical. The pitch control switch 10 is tilted when the inner gimbal 6 tilts about the pitch axis 7, and the roll control switch 11 is tilted when the inner gimbal tilts about the roll axis 4. They preferably contain, as illustrated in Fig. 2, central contacts 10a and 11a and a pair of end contact posts or rods 10b and 10c, and 11b and 11c which project into electrolytes contained in sealed casings formed of glass or plastic, and containing bubbles 10d and 11d. When the inner gimbal tilts in pitch or roll directions the bubbles shift relative to the inwardly projecting rods 10b and 10c, or 11b and 11c to selectively vary the current passing through the conductors 10e, 10f and 10g, thus controlling the degree and direction of the application of rotative torque between the rotor and stator 5b, 5a of the pitch torque motor 5, and through the conductors 11e, 11f and 11g, to control the degree and direction of the application of rotative torque between the rotor and stator of the roll or bank torque motor 8.

Explaining first, the normal or conventional hookup, which is also the same under normal and straight flying conditions in my improved control system, shown in Figure 2, current is introduced at the terminals A, B and C from any suitable source, the terminals B and C being connected to the stator (or rotor) coils 5s and 8s of the pitch and the bank torque applying motors 5 and 8 to provide a fixed or constant potential through the stator coils 8s, 5s. The fixed and controlling field coils 5s, 5t and 8s and 8t of the pitch and bank torque applying motors 5 and 8 are supplied with electrical energy in a relative 90 degree out-of-phase relation, under the control of the pitch and bank control pendulums, or gravity responsive switches 10 and 11. The terminals A and C are bridged by a center tap coil or bridge 12, with the center tap 13 connected to a conductor 14 which leads to one end of the control field coil 5t of the pitch torque motor 5. The other end of the controlling field coil 5t is connected by a conductor 15 to the conductor 10e from the center terminal 10a of the pitch control gravity responsive switch device 10. Current from the terminals A and C is thus normally balanced by the resistance of the electrolyte in the pitch control device 10 when the inner gimbal is level with the bubble at center, and relative tilt of the inner gimbal and the device 10 allows the bubble to shift to increase or decrease the ratio of the amount of current supplied through the conductor 15 from one or the other of the conductors 16 or 18 to the pitch motor coil 5t, applying rotative torque to the pitch torque motor, tending to tilt the outer gimbal 3 around the roll axis 4 to precess the rotor spin axis in the pitch direction. The direction of movement of the bubble, of course, determines which current potential (A or C) predominates, and in turn determines the direction of torque application, and the direction of the precession of the gyro rotor spin axis about the pitch axis 7.

The same situation is present in regard to the roll or bank torque motor 8 and the normal controlling relation of the roll or bank operated gravity responsive switch device or level 11. The fixed field 8s of roll torque motor 8 is energized to the conductors 17 and 18, one end of the controlling field coil 8t being connected to the conductor 14 through 14a and the other end to the central tap 11a of the gravity or roll control switch or resistance unit 11 (by the conductor 11e which is connected to 11a).

Displacement of the bubble 11d toward either of the rods 11b or 11c causes a predominating electrical potential from terminal C to be present in the conductors 18 and 11f, or from the terminal A to be present in the conductors 16 and 11g, which is impressed on the controlling field 8t, causing application of a rotatable torque to the roll or bank torque motor 8, tending to rotate the inner gimbal 6 about the pitch axis 7 which, in turn, precesses the rotor spin axis 9b in the roll or bank direction. The direction of the application of the torque determines the direction of the precession of the rotor spin axis.

In straight flight, these conditions are satisfactory, but during turns or banks of an aircraft, where the turn around a vertical axis, for instance, is prolonged, the turn or bank errors, due to acceleration, and tendency of the gyroscope to become fixed in space as to its tilt, become converted to pitch errors, and this condition becomes serious. The conversion of the errors are as follows:

1. Left turn:
    (a) Deflection of top of gyro to the right produces a deflection of top of gyro aft (or rearwardly).
    (b) Deflection of top of gyro to the left produces a deflection of the top of the gyro forward.
2. Right turn:
    (a) Deflection of top of gyro to the right produces a deflection of the top of gyro forward.
    (b) Deflection of top of gyro to the left produces a deflection of top of gyro aft.

It can thus be seen that the direction that the pitch erector has to work during a turn is an indication of the direction of a roll or bank axis error, and since the direction of the error is known a corrective torque can be applied to the gyro to eliminate the error.

In my improved control system, as disclosed in Figure 2, for the purpose of eliminating these turn errors, I provide a triple throw two pole switch device, indicated generally at 19. The pivoted switch contacts are indicated at 20 and 21, and when in mid position as shown, make contact with the central contacts 22 and 23.

The contact blade 22 is connected at its pivot end by a conductor 22a to the same end of the controlling field coil of the roll or bank torque motor 5 that the conductor 11e was connected to in the conventional arrangement, the center terminal 22 being connected to the conductor 11e, thus completing the circuit from the central terminal of the gravity controlled bank or roll pendulum 11. The other end of the roll torque motor controlling field coil 8t is connected by a conductor 21a to the pivot end of the switch blade 21, while the center contact 23 is connected to conductor 14a through a conductor 24 which is also connected to the two outside stationary contacts 25 and 26 of the switch device 19. The conductor 24 is thus connected through the conductors 14a and 14 to the center tap of the coil 12.

The other two stationary or inside contacts of the switch device, indicated at 27 and 28 are respectively connected together and to the conductor 15 by the conductor 29. The two pivoted contact blades 20 and 21 are insulated from each other and connected by a link 30 for simultaneous movement from their mid positions as shown, to permit engagement of either the two contacts 26 and 27 when the switch blade is moved upwardly from the position shown in Fig. 2, or to contact the contacts 28 and 25 when swung downwardly.

The blades, when shifted to either of their "up or down" positions, disconnect the bank or roll pendulum control device 11 from the bank or roll torque motor 8 and connect the bank or roll torque device 8 to the gravity responsive switch 10. Movement of the switch device between its extreme limits reverses the connections to the ends of the controlling field coil 5t of roll torque motor 8.

As before pointed out, in a left turn, a bank error in which the top of the gyro is to the right of vertical as viewed in the direction of the line of flight produces a deflection of top of gyro aft (or rearwardly) and a bank error in which the top of the gyro is to the left produces a deflection of top of gyro forward. Similarly, in a right turn, a bank error in which the top of the gyro is to the right of vertical as viewed in the direction of the line of flight produces a deflection of the top of gyro forward and a bank error in which the top of the gyro is to the left produces a deflection of top of gyro aft.

In order to compensate for "turn error" the movement of switch blades 20—21 in one direction switches erection as follows during a left turn:

a. When the switch 10 conducts current to pitch torque motor 5 to erect the top of gyro rotor 9 forward, it also conducts current to roll torque motor 8 to erect the top of rotor 9 to the left.

b. When the switch 10 conducts current to pitch torque motor 5 to erect the top of gyro rotor 9 aft, it also conducts current to roll torque motor 8 to erect the top of rotor 9 to the right.

Similarly, the movement of switch blades 20—21 in the other direction switches erection as follows during a right turn:

a. When the switch 10 conducts current to pitch torque motor 5 to erect the top of gyro rotor 9 aft, it also conducts current to roll torque motor 8 to erect the top of rotor 9 to the left.

b. When the switch 10 conducts current to pitch torque motor 5 to erect the top of gyro rotor 9 forward, it also conducts current to roll torque motor 8 to erect the top of gyro rotor 9 to the right.

Following the turn the blades 20 and 21 are moved to their mid position again and the electric circuit is then the same as disclosed in Fig. 2 with the bank control switch 11 controlling the bank torque motor 8 and the pitch control switch 10 controlling the pitch torque motor 5.

The switch may be shifted manually, or by a pair of opposed electro-magnets 31—32 having an armature normally centralized by a spring, with manually controlled energizing circuits 33, or the switch device may be shifted automatically during turns by actuating means connected to or controlled by the steering control apparatus 34 of the craft on which the gyro vertical is mounted, as seen in Fig. 4. The rudder bar is indicated at 34a, the rudder at 34b, operating cables at 34c, one of which is connected to an actuator 34d which shifts the switch blades when the rudder 34b turned beyond a certain angle.

In Figure 4 a "rate of turn" gyro is indicated at 35 having a crank 35a for controlling the actuation of the switch blades 20', 21' when the turn exceeds a predetermined rate.

The drawings are exemplary, it being obvious that various minor changes may be made in the apparatus from that depicted, without departing from the spirit of the invention as set forth in the accompanying claims.

I claim as my invention:

1. In a gyro vertical, a support, a gyroscope gimbaled thereon for tilt in pitch and roll directions when the same is mounted in a craft, a first torque applying means operable between the support and the gyroscope for precessing the gyroscope to vertical in the pitch direction, second torque applying means operable between the support and gyroscope for precessing the gyroscope to vertical in the roll direction, first torque control means on the gyroscope responsive to tilt of the gyroscope in the pitch direction for actuating the first torque applying means to erect the gyroscope to vertical in the pitch direction, second torque control means on the gyroscope responsive to tilt of the gyroscope in the roll direction connected to the second torque applying means for actuating the second torque applying means for erecting the gyroscope to vertical in the roll direction, and shiftable connecting means operable between the second torque applying means and the first torque control means, normally connecting the second torque control means to the second torque applying means and shiftable to connect the second torque applying means to the first torque control means for erecting the gyroscope to vertical in a pitch direction and roll direction from signals received from the first torque control means.

2. In a vertical gyroscope, a support, a rotor gimbaled thereon for tilting movements in pitch and roll directions, first electrical erecting means operable between the support and gyroscope for erecting the rotor to vertical in a pitch direction, second electrical erecting means operable between the support and gyroscope for erecting the rotor to vertical in a roll direction, a first circuit controlling switch device responsive to tilt of the rotor in the pitch direction including an energizing circuit controlled thereby and connected to the first electrical erecting means for erecting the rotor to vertical in the pitch direction incident to tilt thereof in the pitch direction, a second circuit controlling switch device responsive to tilt of the rotor in the roll direction including an energizing circuit controlled thereby connected to the second electrical erecting means for erecting the rotor to vertical in the roll direction incident to tilt thereof in the roll direction, and switch means for disconnecting the second electrical control means from the second electrical erecting means during turns and connecting the first electrical control means to the second electrical erecting means, whereby erection of the gyroscope in the roll direction during turn is controlled by the first or pitch erection circuit controlling switch device.

3. In a gyro vertical, a gyroscope having its spin axis tiltable in pitch and roll directions when mounted on a support which is tiltable in pitch and roll directions and turnable about a vertical axis, whereby during a turn of the support about the axis through an angle of substantially 90° a roll indicating error of the gyroscope tends to indicate a pitch indicating error, electrical roll direction erecting means for erecting the gyroscope spin axis to vertical in the roll direction including a gravity responsive roll direction control device, responsive to tilt of the gyroscope spin axis in the roll direction and connected to the electrical roll direction erecting means to precess the gyroscope spin axis to vertical in the roll direction, electrical pitch direction erecting means to precess the gyroscope spin axis to vertical in the pitch direction including a gravity responsive circuit energizing pitch responsive control device, responsive to tilt of the gyroscope spin axis in the pitch direction and connected to the electrical pitch direction erecting means for energizing the pitch direction erecting means to restore the gyroscope spin axis to vertical in the pitch direction, and cooperating switch means connected between the pitch and roll erecting means and the energizing circuits therefor from the gravity responsive pitch and roll control devices, operable to disconnect the electrical roll direction erecting means from the gravity responsive roll direction control device and connect said electrical roll erecting means to said electrical pitch responsive control device for precessing the gyroscope spin axis to vertical in the roll direction during turns under the control of the gravity responsive pitch direction control device.

4. Apparatus as claimed in claim 3 in which said switch means is movable to two roll erecting control positions during turns, one position for precessing the gyroscope spin axis in the roll direction in one direction for turns in one direction, and a second position for precessing the gyroscope spin axis in the roll direction in the opposite direction for turn in the opposite direction.

5. In a vertical gyroscope, of the class described, erecting means therefor for precessing the gyroscope to erect the spin axis of the rotor to vertical in transverse intersecting directions in pitch and roll planes, including gravity responsive electrical circuit controlling means having energizing circuits controlled thereby connected to electrical torque applying erecting means responsive to tilt of the rotor spin axis in opposite directions in the pitch and roll planes for precessing the gyroscope to erect the gyroscope spin axis to vertical from a tilted position at opposite sides of the vertical in the pitch and roll planes, and electrical switch means in said energizing circuits for connecting the gravity responsive electrical circuit controlling means to the electrical torque applying erecting means for erecting the spin axis of the gyroscope toward vertical in roll plane incident to displacement of the gravity responsive electrical circuit control means in the pitch plane during turns.

6. In a gyro vertical, a movable support subject to tilting displacement in a pitch plane in the direction of movement of the support about a roll axis, and subject to tilting displacements in a roll plane transverse to the direction of movement of the support about a pitch axis in the pitch plane, and to turning displacement about a vertical axis, an outer gimbal carried by the support for tilting displacement about the roll axis, electrical torque applying means between the outer gimbal and the support for applying rotative torque to the outer gimbal about the roll axis, an inner gimbal tiltably carried by the outer gimbal on an intersecting pitch axis in the pitch plane perpendicular to the roll axis, electrical torque applying means between the inner and outer gimbals for selectively applying rotative torque to the inner gimbal about the pitch axis, a gyroscope rotor rotatably mounted in the inner gimbal having a spin axis intersecting the pitch and roll axes perpendicular to the pitch axis, gravity responsive electrical pitch control means carried on the inner gimbal and responsive to tilt of the inner gimbal about the pitch axis, including energizing control circuits controlled thereby connected to the electrical torque applying means between the support and the outer gimbal for precessing the inner gimbal and rotor spin axis toward vertical about the pitch axis, gravity responsive electrical roll control means carried on the inner gimbal responsive to tilt of the inner gimbal about the roll axis including energizing control circuits controlled thereby connected to the electrical torque applying means between the inner and outer gimbals for applying rotative torque to the inner gimbal about the pitch axis, to precess and erect the inner gimbal and rotor spin axis toward vertical about the roll axis, and selective switch control means connected between said energizing circuits, movable to selectively disconnect the torque applying means between the inner and outer gimbal from the electrical roll control means and connect the torque applying means between the inner and outer gimbals to the gravity responsive pitch control means to cause the gravity responsive pitch control means during turns of the support about the vertical axis to energize the torque applying means between the inner and outer gimbal to erect the gyroscope spin axis toward vertical position.

7. In a gyroscope vertical indicating apparatus for a movable support, tiltable in pitch in the direction of movement of the support, and tiltable in roll direction transverse to the direction of movement of the support and during turning movements about a vertical axis, a vertical indicating gyroscope, gimbal means on the support, supporting the gyroscope for tilting displacements in the pitch and roll directions, a roll controlling gravity responsive electric switch device tiltable with the gyroscope in the roll direction, a pitch controlling gravity responsive electric switch device tiltable with the gyroscope in the pitch direction, a roll axis electric torque motor between the gyroscope and the support for applying rotative torque when energized to the gimbal means in the roll direction for precessing the gyroscope toward vertical in the pitch direction, a pitch axis electric torque motor between the gyroscope and the support for applying rotative torque to the gyroscope in the pitch direction when energized for precessing the gyroscope toward vertical in the roll direction, an electric energizing roll circuit between the roll controlling switch device and the pitch axis electric torque motor for erecting the gyroscope toward vertical in the roll direction, an electric energizing pitch control circuit between the pitch controlling switch device and the roll axis electric torque motor for erecting the gyroscope toward vertical in the pitch direction, and switch means in said energizing circuits having a normal position completing said pitch and roll energizing circuits and movable in one direction to interrupt the roll control circuit to the pitch axis torque applying electric motor and connect the pitch controlling circuit to the pitch axis torque applying electric motor for precessing the gyroscope toward vertical in the roll direction from signals received from the pitch controlling gravity responsive electric switch device, the direction of roll erection being dependent upon direction of pitch error and direction of turn, and movable in the opposite direction from its normal position to interrupt the roll control circuit to the pitch axis torque applying electric motor and connect the pitch controlling circuit to the pitch axis torque applying electric motor for operating the same reversely, to precess the gyroscope toward vertical in the roll direction from signals received from the pitch controlling gravity responsive electric switch device, direction of roll erection dependent upon direction of pitch error and direction of turn.

8. In a gyro vertical having a support adapted to be tilted in pitch and roll directions, and rotated about a substantially vertical axis, a gimbaled gyroscope rotor mounted thereon for tilt in pitch and roll directions, roll direction torqueing means for selectively precessing the gyroscope spin axis in opposite pitch directions, pitch direction controlled gravity responsive energizing means selectively shiftable in opposite pitch directions for selectively energizing the roll direction torqueing means in opposite directions to precess the rotor spin axis selectively in the opposite pitch directions, pitch direction torqueing means for selectively precessing the rotor spin axis in opposite roll directions, roll direction controlled gravity responsive energizing means selectively shiftable in opposite roll direction for selectively energizing the pitch direction torqueing means in opposite directions to selectively precess the rotor spin axis in the opposite roll directions, and shiftable connecting means operable between the roll direction torque applying means and the pitch direction controlled gravity responsive energizing means shiftable for precessing the rotor spin axis selectively in the roll directions under the control of the pitch direction controlling gravity responsive energizing means.

9. In a gyroscope device, a gyroscope, a reversible pitch torque applying electric motor for erecting the gyroscope to vertical from opposite directions in the pitch direction, a reversible roll torque applying electric motor for erecting the gyroscope to vertical in opposite directions in the roll direction, a gravity controlled pitch erecting double throw switch device including energizing pitch control circuits controlled by said pitch erecting switch device and connected to the pitch torque motor and carried by the gyroscope, a gravity roll controlled, roll erecting double throw switch device including an energizing roll control circuit controlled by said roll erecting switch device and connected to the roll torque motor and carried by the gyroscope, said gravity controlled pitch and roll switch device being tiltable respectively in opposite directions in pitch and roll directions to energize the pitch and roll control circuits respectively to reversely energize the pitch and roll torque motors to erect the gyroscope spin axis from opposite directions toward vertical in the pitch and roll directions, and a double pole triple throw switch, or equivalent, connected in said pitch and roll circuits to complete the same when in a mid-position and shiftable for left turns such that the pitch control switch device conducts current simultaneously to the pitch and roll torque motors in a manner such that the top of the gyro is erected to the left in roll as it is erected forward in pitch and similarly, the top of the gyro is erected to the right in roll as it is erected aft in pitch; also, in right turns the double pole triple throw switch, or equivalent, is shiftable such that the pitch control switch device conducts current simultaneously to the pitch and roll torque motors in a manner such that the top of the gyro is erected to the left in roll as it is erected aft in pitch and similarly, the top of the gyro is erected to the right in roll as it is erected forward in pitch.

10. In a gyro vertical, a gyroscope subject to tilting displacements in pitch and roll directions, a pitch torque motor for erecting the gyroscope to vertical in the pitch direction including connected pitch controlled gravity responsive energizing means therefor, a roll torque motor for erecting the gyroscope to vertical in the roll direction including roll controlled gravity responsive energizing means connected to the roll torque motor for actuation thereof, and shiftable switch means between the roll torque motor and the pitch controlled gravity responsive energizing means for connecting the roll torque motor to the pitch controlled gravity responsive energizing means for energizing the roll torque motor by the pitch controlled gravity responsive energizing means.

11. In a gyro vertical, a gyroscope subject to tilting displacements in pitch and roll directions, a pitch torque motor for erecting the gyroscope to vertical in the pitch direction including connected pitch controlled gravity responsive energizing means therefor, a roll torque motor for erecting the gyroscope to vertical in the roll direction including roll controlled gravity responsive energizing means connected to the roll torque motor for actuation thereof, and shiftable switch means between the roll torque motor and the gravity responsive energizing means for connecting the roll torque motor to the pitch controlled gravity responsive energizing means, shiftable to simultaneously energize the pitch and roll torque motors from the pitch control gravity responsive energizing means.

JOHN S. ADKINS.

REFERENCES CITED

The following references are of record in the file of this patent:

UNITED STATES PATENTS

| Number | Name | Date |
| --- | --- | --- |
| 2,367,465 | Kunzer | Jan. 16, 1945 |
| 2,446,180 | Haskins | Aug. 3, 1948 |